United States Patent [19]

Rais

[11] Patent Number: 4,552,396
[45] Date of Patent: Nov. 12, 1985

[54] BOTTLE HANDLE FOR PLASTIC PRONG BOTTLE

[76] Inventor: John M. Rais, 520 Westport Ave., Norwalk, Conn. 06851

[21] Appl. No.: 665,948

[22] Filed: Oct. 29, 1984

[51] Int. Cl.$^4$ .............................................. B65D 23/10
[52] U.S. Cl. .................................. 294/27.1; 294/31.2; 215/100 A; 220/94 A
[58] Field of Search ...................... 294/27 H, 31.2, 32, 294/33, 27 R; 215/100 A; 248/145.6; 220/94 R, 94 A, 91

[56] References Cited

U.S. PATENT DOCUMENTS

| D. 265,159 | 6/1982 | La Barbera | D7/99 |
|---|---|---|---|
| 1,825,897 | 10/1931 | Brooke | 294/31.2 |
| 3,056,622 | 10/1962 | Hilderbrandt et al. | 294/31.2 |
| 3,202,309 | 8/1965 | Simpson | 215/100 A |
| 3,326,591 | 5/1965 | Richter et al. | 294/32 |
| 3,488,078 | 1/1970 | Cooperstein | 294/31.2 |
| 3,624,788 | 11/1971 | McMahon et al. | 294/32 |
| 3,688,936 | 9/1972 | Killgrew, Jr. | 294/27.1 |
| 3,990,596 | 11/1976 | Hoftman | 215/11 R |
| 4,299,366 | 11/1981 | Kurzius | 248/145.6 |
| 4,368,826 | 1/1983 | Thompson | 215/100 A |
| 4,379,578 | 4/1983 | Schuler | 294/31.2 |

Primary Examiner—James B. Marbert
Attorney, Agent, or Firm—Kramer and Brufsky

[57] ABSTRACT

A reusable handle for manipulating a plastic soft drink bottle. The handle has a hook-like projection on one end adapted to clamp to the neck of the bottle and an arcuate loop at its opposite end insertable about an integral prong extending downwardly from the base of the bottle to secure the handle to the bottle. The intermediate portion of the handle between the hook-like projection and looped end comprises an elongated strap of a rigidified cross-section running adjacent to and along the exterior wall of the bottle. The central portion of the strap is provided with a vertical loop defining a finger grip so that the handle and bottle can be lifted and manipulated to pour the contents of the bottle.

7 Claims, 7 Drawing Figures

BOTTLE HANDLE FOR PLASTIC PRONG BOTTLE

BACKGROUND OF THE INVENTION

1. Field of the Invention

This invention relates to a separable bottle handle and more particularly, a reusable handle adapted to be secured to a plastic soft drink bottle between the neck and base of the bottle to aid in lifting the bottle and dispensing the contents thereof.

2. Description of the Prior Art

Soft drink manufacturers have introduced larger sized bottles as an economy measure. These bottles, typically two liter liquid containing bottles, are made of plastic and are of a large exterior diameter such that handling and manipulating of the bottles to pour the contents is somewhat inconvenient, particularly for children.

The bottle is provided with a flange-like member near the neck above which a threaded portion is provided for reception of an aluminum closure cap. The base of the bottle has either a cup-like base member which is adhesively secured to the bottom of the bottle and extends upwardly along the lower side wall of the bottle to rigidify the base and provide a smooth surface for seating the bottle on a plane surface or a plurality of integrally molded, spaced bumps or prongs used to support the bottle on a plane surface.

It has been proposed heretofore to provide reusable handles for soft drink bottles Examples of such handles are illustrated in U.S. Pat. Nos. 4,379,578; 4,368,826; 3,326,591; 3,056,622; 3,990,596; 4,299,366; 3,488,078; 1,825,897 and Des. 265,159. Indeed, in my prior, co-pending patent application, Ser. No. 572,447, filed Jan. 20, 1984, I disclosed a reusable handle for manipulating a large soft drink bottle provided with a cup-shaped base member. The handle had a hook-like portion for clamping the handle to the bottle neck and a prong portion insertable between the side of the bottle and the interior surface of the cup-shaped base, which removably locked the handle in place. An intermediate strap-like portion of the handle included a finger-gripping loop so the handle can be grasped and the bottle lifted to dispense its contents. However, none of the reusable handles illustrated in these patents or in my prior patent application are particularly suitable for use with a soft drink bottle having molded spaced bumps or prongs on its base, or if they are, operate in a manner completely different from the handle of the present invention, which is rigidly locked to the bottle so that the bottle cannot be accidently displaced relative to the handle during the pouring operation.

SUMMARY OF THE INVENTION

In accordance with the present invention, a rigid reusable handle is provided for manipulating a plastic soft drink bottle having a flange like projection at the neck of the bottle and a plurality of spaced bumps or prongs on its base to provide a seat enabling the bottle to be maintained in an upright condition on a plane surface. The handle has a substantially horizontal hook-like projection on one end adapted to clamp to the neck of the bottle beneath the flange and a rigid bifurcated portion at its opposed end whose arms are joined in an arcuate integral loop provided with a substantially diamond-shaped opening insertable over and around one of the integral bumps or prongs on the bottle base and into engagement with the walls defining the bump or prong. The intermediate portion of the handle between the hook-like projection and bifurcated looped end portion comprises an elongated strap of a rigidified X or T-shaped cross-section running adjacent to and along the outer wall of the bottle. The central portion of the strap is provided with a second loop in a substantial vertical plane defining a finger grip so that the strap and bottle to which the strap is secured can be lifted together and manipulated to pour the contents of the bottle.

BRIEF DESCRIPTION OF THE DRAWINGS

Further objects and advantages of the invention will become apparent in the following description and claims, and from the accompanying drawings, wherein:

DETAILED DESCRIPTION OF THE PREFERRED EMBODIMENT

Figure 1:
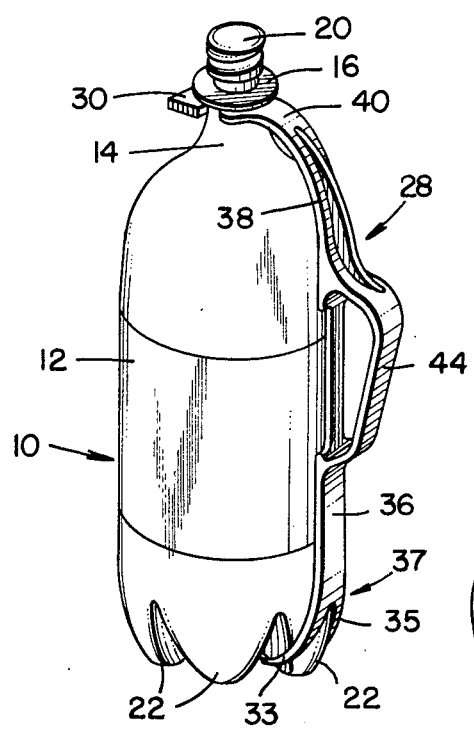
FIG. 1 is a perspective view of the handle of the present invention secured to a plastic soft drink bottle.
Figure 2:
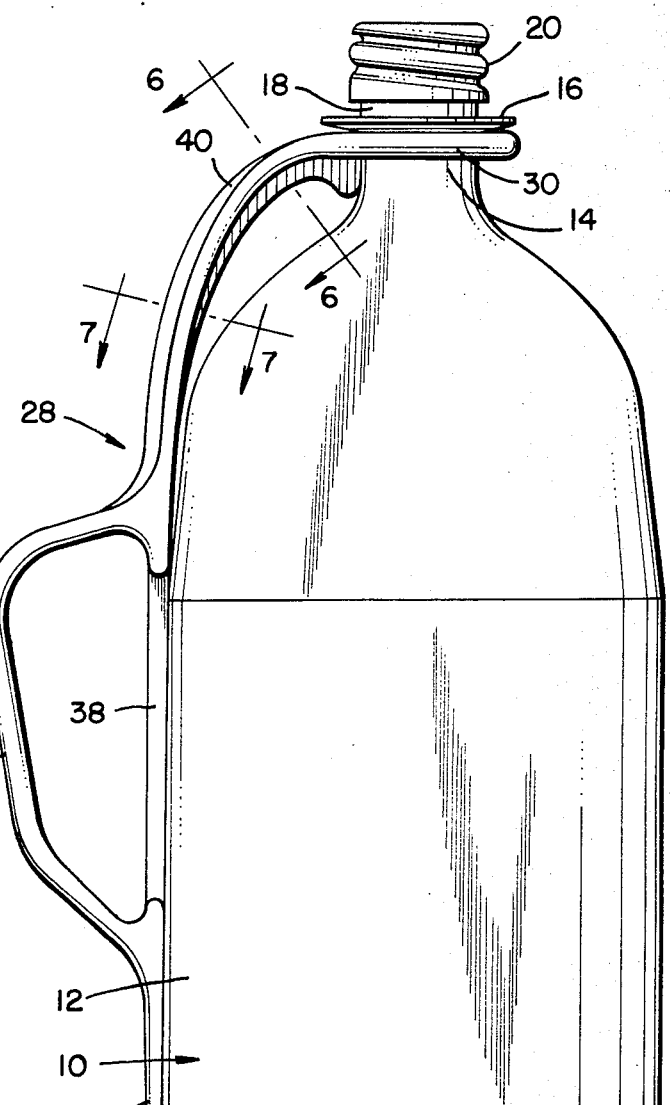
FIG. 2 is a side view in elevation of the handle and bottle of FIG. 1.
Figure 3:
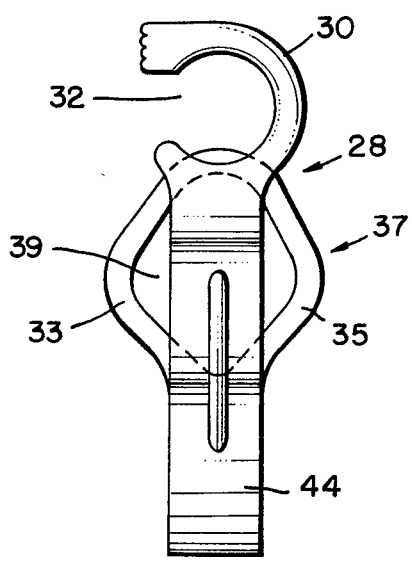
FIG. 3 is a top plan view of the handle shown in FIG. 2.
Figure 4:
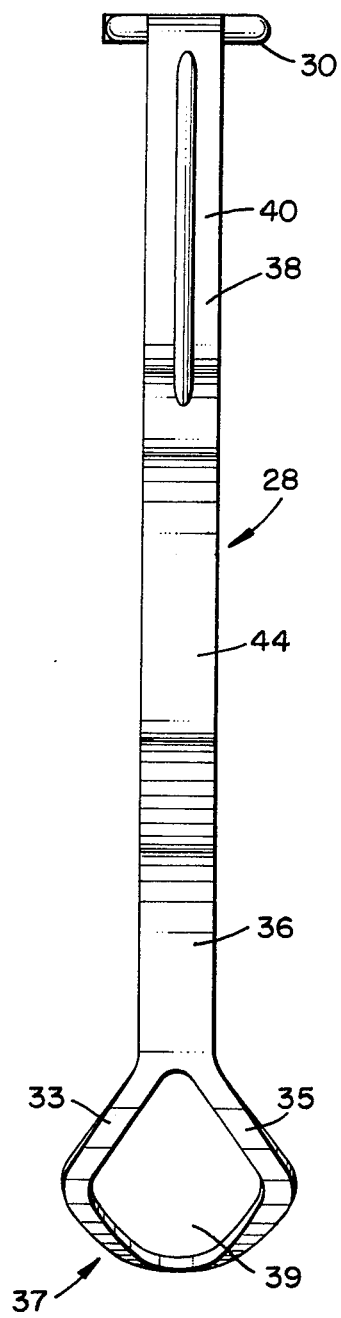
FIG. 4 is a front view in elevation of the handle shown in FIG. 3.
Figure 5:
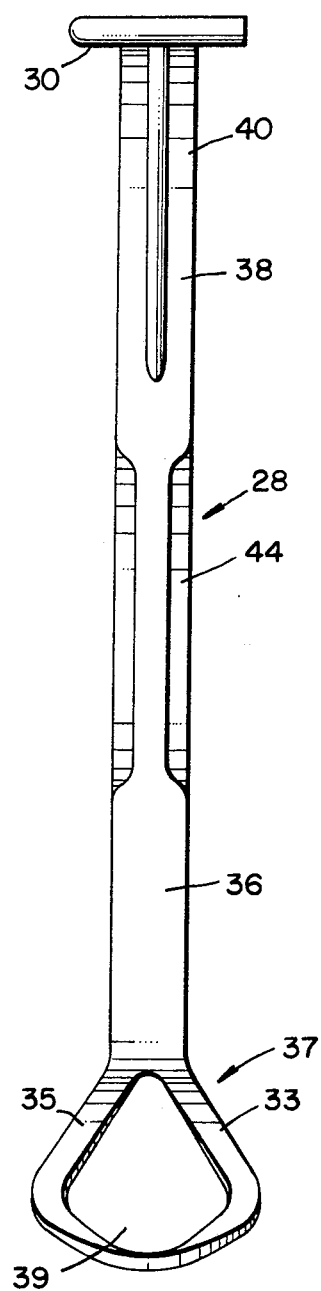
FIG. 5 is a rear view in elevation of the handle shown in FIG. 3.
Figure 6:
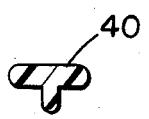
FIG. 6 is a cross-sectional view taken substantially along the plane indicated by line 6—6 of FIG. 2.
Figure 7:
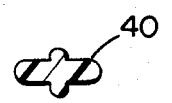
FIG. 7 is a cross-sectional view taken substantially along the plane indicated by line 7—7 of FIG. 2.

Referring now to the drawings in detail, wherein like numerals indicate like elements throughout the several views, a plastic soft drink bottle 10 is illustrated in FIGS. 1 and 2. Soft drink bottle 10 includes a rather large diameter annular side wall 12 terminating in a smaller diameter neck 14 provided with an annular flange 16 above which the neck is threaded at 18 to receive an aluminum cap for closing the bottle. The bottom of the bottle is provided with a plurality of spaced bumps or prongs 22 which are integrally molded with the side wall 12 to rigidify and form a seat for supporting the bottle on a plane surface.

A detachable, reusable strap-like handle 28 can be secured to bottle 10 as illustrated in FIGS. 1 and 2, to aid in manipulating the rather large bottle 10 so as to readily pour the contents therefrom.

Strap-like handle 28 is provided with a hook-like member 30 at one end thereof lying in a substantially horizontal plane. The hook-like member 30 is provided with an opening 32 of slightly less width than the diameter of the neck 14 of bottle 10, while the remainder of the interior surface of the hook-like member 30 is substantially semi-circular in plane elevation and has a diameter which approximates the diameter of the neck 14 of bottle 10.

The opposite end of the strap-like handle member 28 includes a rigid molded loop 37 formed from a pair of bifurcated arms 33, 35 joined at opposite ends about a substantially diamond-shaped opening 39. The loop 37 is arcuate with an outer convex surface and an inner concave surface. The inner edges of the arms 33, 35 forming loop 37 complement the shape of the bump or prong 22 so that when the loop 37 is placed about a bump or prong 22 the edges lie snuggly adjacent to the outer surface or contour of the bump or prong.

The hook-like member 30 and looped end 37 at opposite ends of the handle 28 are joined by a strap 38 having a first, arcuate portion 40 joined to the hook-like member 30 and a second, substantially vertical portion 36 joining the arcuate portion 40 to the loop 37. When secured to the bottle 10, the second, substantially vertical portion 36 of the strap 38 between the loop 37 and the hook 30 lies closely adjacent to the exterior side wall surface 12 of the bottle 10.

Integrally provided on the second, vertical portion 36 of the connecting strap 38 between the hook-like member 30 and loop 37 is a vertical finger-gripping loop 44 molded integrally with, but spaced from the second portion 36 of the strap 28. Fingers can be inserted through the loop portion 44 to raise and tilt the strap-like handle 28 along with the bottle 10 to which it is secured.

As illustrated in FIG. 2, the arcuate portion 40 of the handle 28 between the hook-like member 30 and the prong member 34 is first T-shaped and then substantially X-shaped in cross-section in order to substantially rigidify the strap-handle 28 and preclude substantial bending thereof while in use.

In use, the strap-like handle element 28 can be secured to bottle 10, as illustrated in FIG. 2, by first positioning the arms 33, 35 of rigid, arcuate loop 37 about one of the prongs 22. Then, the hook-like member 30 is secured to the neck of the bottle 10 by passing the neck 14 through the opening 32, causing the hook-like member 30 to spread slightly until the neck passes through the opening 32 into snap engagement with the complementary semi-circular interior portion of hook-member 30. This will rigidly secure or lock the handle 28 to the bottle 10 with the finger loop portion 44 ready to be gripped by the user to raise, tilt and manipulate the bottle 10 so the contents can be poured therefrom upon removal of the cap from the threads above the flange 14. The vertical portion 36 of strap 38 lies adjacent to sidewall 12 of bottle 10 while arcuate portion 40 is spaced therefrom, but of a rigidified cross-section, precluding substantial deformation or twisting of handle 28 when the handle and bottle are lifted.

What is claimed as new is:

1. A reusable handle adapted to be secured to a bottle having an annular side wall terminating in a neck at one end and a bottom formed from a plurality of spaced support prongs at its opposite end, said handle comprising:
    a rigid, arcuate looped first portion at one end of said handle having a substantially diamond-shaped opening adapted to be inserted about a support prong of a bottle,
    a substantially horizontal hook-like second end portion at the opposite end of said handle adapted to encompass the neck of a bottle, and
    an intermediate strap-like portion joining said hook-like second end portion with said looped first end portion,
    said intermediate strap-like portion including a finger gripping substantially vertical loop intermediate the ends thereof.

2. The reusable handle of claim 1 wherein said hook-like member on said second end portion includes an opening therein and a semi-circular interior portion joined to the portion defining the opening therein.

3. The reusable handle of claim 1 wherein the intermediate strap-like portion includes
    a first arcuate portion and
    a substantially vertical second portion,
    said finger gripping loop portion being formed on said second vertical portion of said strap-like member and
    said first arcuate portion joining said horizontal hook-like member to said finger gripping loop containing portion.

4. The reusable handle of claim 1 wherein the first arcuate portion of said strap-like member includes a portion of substantially T-shaped cross-section.

5. The reusable handle of claim 1 wherein the first arcuate portion of said strap-like member includes a portion of substantially X-shaped cross-section.

6. The reusable handle of claim 1 wherein said looped end portion includes a bifurcated portion of said intermediate strap-like portion joined at opposite portions to form a loop.

7. The reusable handle of claim 6 wherein the outer surface of said looped end portion is convex and said inner surface is concave.

* * * * *